(12) United States Patent
Citrich et al.

(10) Patent No.: US 7,339,133 B2
(45) Date of Patent: *Mar. 4, 2008

(54) STUD WELDING METHOD AND STUD WELDING DEVICE PARTICULARLY FOR STUD WELDING WITHOUT A SUPPORT FOOT

(76) Inventors: Ulrich Citrich, Balzerholz 14, 58285 Gevelsberg (DE); Jurgen Madsak, Pastor-Hellweg-Strasse 29a, 58339 Breckerfeld (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/399,148

(22) Filed: Apr. 6, 2006

(65) Prior Publication Data

US 2006/0219670 A1   Oct. 5, 2006

Related U.S. Application Data

(63) Continuation of application No. 10/257,038, filed on Jul. 8, 2003, now Pat. No. 7,053,331.

(30) Foreign Application Priority Data

Apr. 12, 2000   (DE) ................................ 100 18 231
Apr. 12, 2001   (DE) ..................... PCT/DE01/01454

(51) Int. Cl.
    *B23K 9/20* (2006.01)
(52) U.S. Cl. .......................................... 219/98; 219/99
(58) Field of Classification Search ................. 219/98, 219/99
    See application file for complete search history.

(56) References Cited

U.S. PATENT DOCUMENTS 5,030,815 A    7/1991   Glorioso
5,171,959 A *  12/1992  Schmitt et al. ............... 219/98
5,406,044 A    4/1995   Killian et al.
5,502,291 A *  3/1996   Cummings .................... 219/98
6,001,234 A    12/1999  Batz, Jr. et al.

(Continued)

*Primary Examiner*—Kevin P. Kerns
(74) *Attorney, Agent, or Firm*—Gifford, Krass, Sprinkle, Anderson & Citkowski, P.C.

(57) ABSTRACT

The invention relates to a stud welding method, particularly for welding without a supporting foot, which makes it possible to securely detect the presence or the absence of a part to be welded in the stud holding device. For this purpose, in a first embodiment of the method, the stud holding device is first positioned in a pre-determined distance relative to the surface of the workpiece without a part to be welded. Then, a part to be welded is supplied. When the welding axle moves towards the workpiece, the distance which has to be covered until the part to be welded contacts the workpiece is detected. On the basis of the previously determined distance between the stud holding device and the workpiece and on the basis of the distance covered, conclusions on the presence or the absence of a part to be welded may be drawn. In another embodiment, the stud holding device is moved towards the workpiece together with a part to be welded until a contact is detected. If, after detecting the contact, it is possible to further move the welding axle into the stud holding device as a result of a displacement of the part to be welded, this will be interpreted as an indication to the presence of a part to be welded. Furthermore, the invention relates to a device for carrying out the method and to a computer program for an evaluation and control unit of generally known welding devices.

7 Claims, 3 Drawing Sheets

U.S. PATENT DOCUMENTS 6,011,234 A * 1/2000 Kirchner et al. .............. 219/98
6,940,035 B2 9/2005 Goebel
7,053,331 B2 * 5/2006 Citrich et al. ................. 219/98
2004/0050826 A1 3/2004 Citrich et al.

* cited by examiner

STUD WELDING METHOD AND STUD WELDING DEVICE PARTICULARLY FOR STUD WELDING WITHOUT A SUPPORT FOOT

CROSS-REFERENCE TO RELATED APPLICATIONS

This application is a continuation of U.S. patent application Ser. No. 10/257,038 filed Jul. 8, 2003 now U.S. Pat. No. 7,053,331, which claimed priority from PCT/DE01/01454 filed Apr. 12, 2001, which claimed priority from German application DE10018231.3 filed Apr. 12, 2000.

FIELD OF THE INVENTION

The invention relates to a method and a device for stud welding, particularly for stud welding without a supporting foot.

BACKGROUND OF THE INVENTION

In stud welding devices predominantly used up to now, a welding head or, for manual welding, a welding gun is employed, with a supporting foot or a spacer being provided at the front end of the welding head or the welding gun, respectively. Thus, after placing the stud welding head or the welding gun upon the surface of the workpiece with the supporting foot, a defined position is obtained, particularly a defined distance between the welding head or the welding gun and the surface of the workpiece. Then, taking this defined position as a starting position, the stud holding device or chuck and the part held therein and to be welded can be moved relative to the surface of the workpiece.

A stud welding device of this kind is described in the document DE 32 15 453 C 1, for example. In this stud welding device, the stud welding gun comprises a drive in the form of an electric motor for the welding axle, with a d.c. motor driving the welding axle (here, the moving part assembly, which comprises all moving parts that cooperate to perform the actual welding movement such as the charging head, the feed cylinder, the feed piston, etc.) and the stud holding device connected therewith in the axial direction. After the welding gun has been placed upon the surface of the workpiece with the supporting foot, the stud holding device is first moved towards the surface of the workpiece until the face of the part held in the stud holding device and to be welded contacts the surface of the workpiece. Then, the current for the pre-current arc or pilot arc is switched on and the welding axle is lifted off from the surface of the workpiece by means of the d.c. motor. Hereby, a pre-current arc is struck. The further course corresponds to the usual process of stud welding with stroke ignition where a pilot arc is struck by placing a stud in good electrical contact with the workpiece, switching on the pre-current and retracting the stud from the workpiece.

Furthermore, from the document EP 0 776 261 B1, a device for welding together at least two parts is known, in which a welding head is oriented opposite to the intended welding area of the workpiece and is then moved towards the workpiece by means of an adjustment drive, e.g. the arm of a robot, until the face of the part to be welded is pressed onto the surface of the workpiece. In the course of this procedure, the welding head is moved towards the workpiece beyond the position in which the part to be welded touches the surface of the workpiece for the first time. For this purpose, the welding axle of the welding head is configured such that it is moved into the welding head when the welding head is moved further towards the workpiece in this way. By providing such an additional path of movement for the welding head, it is possible to make steady contact between the face of the part to be welded and the workpiece within a large range independently of positional tolerances of the workpiece and of tolerances occurring during the movement of the welding head. After the movement of the welding head has been stopped, the welding axle of the welding head can be moved together with the stud holding device and the part to be welded held therein, starting from the starting position thus created, in order to continue the welding operation. This movement is effected by means of the drive for the welding axle. Thus, this device and this method make welding without a supporting foot possible.

Welding without a supporting foot has the advantage, among others, that the welding area, i.e. the area of the surface of the workpiece which has to be accessible for welding, may be markedly smaller compared to welding with a supporting foot. In particular, when welding with a supporting foot, it is hardly possible to weld a part to be welded to a workpiece in relatively narrow grooves of this workpiece.

Particularly in stud welding methods or stud welding devices working without a supporting foot, however, there is a certain danger that if there is no part to be welded in the stud holding device, the stud holding device itself will be welded to the workpiece.

In stud welding devices working with a supporting foot, the presence of a part to be welded in the stud holding device could easily be detected by measuring after placing the welding head upon the workpiece—the distance which the welding axle has to cover when it is moved towards the workpiece until a contact is made. Then, knowing the geometry of the part to be welded and its position in the stud holding device, one can draw conclusions on the presence of a part to be welded, if the distance covered by the welding axle until the part to be welded contacts the workpiece is smaller than a pre-determined distance. This method, however, fails in case of stud welding devices working without a supporting foot.

Accordingly, the object of the invention is to provide a stud welding method and a stud welding device, particularly for stud welding without a supporting foot, in which the presence of a part to be welded in the stud holding device is securely detectable.

The invention achieves this object with the features of patent claims 1 and 10 and 15. Furthermore, the invention provides a program, particularly for upgrading existing stud welding devices, in order to be able to perform the method according to the invention.

SUMMARY OF THE INVENTION

According to an embodiment of the invention, the stud holding device is at first moved towards the surface of the workpiece without a part to be welded being held therein, at least until the face of the part contacts the surface of the workpiece. Then, the stud holding device is lifted off from the workpiece until a pre-determined distance between the face of the stud holding device and the surface of the workpiece is reached. Afterwards, or partially at the same time, a part to be welded can be supplied to the stud holding device. This is preferably done by means of a customary automatic stud supply device. Supplying the stud is effected in such a way that the face of the part to be welded projects from the face of the stud holding device by a pre-determined amount.

Then, the stud holding device is moved towards the surface of the workpiece again until a contact between the face of the part to be welded and the surface of the workpiece is detected. The distance that is covered starting from the distance adjusted primarily between the stud holding device and the workpiece until the contact is detected, allows to draw the conclusion as to whether a part to be welded is held in the stud holding device or not. If the distance covered that has been detected basically corresponds to the distance between the face of the stud holding device and the surface of the workpiece adjusted before, it may be concluded with a high degree of certainty that no part to be welded is held in the stud holding device. However, if the distance covered is smaller than the distance adjusted before, it may be concluded that there a part to be welded is present in the stud holding device. In this case, the welding process can be carried out. Otherwise, the welding process can be blocked or measures can be taken, such as lifting off the stud holding device from the workpiece again by a sufficient amount and supplying a part to be welded again.

On this occasion, it may be remarked that the movement of the stud holding device may be effected either by a movement of the entire welding head, e.g. by an arm of a robot or the like, or by a movement of the welding axle only by means of a drive provided in the welding head.

The method explained above also makes it possible to draw conclusions on an admissible position of the part to be welded in the stud holding device. It is again the difference between the pre-determined distance and the path detected which is covered after supplying the part to be welded, starting from the pre-determined distance, until the point of contact is reached, which may serve this purpose. If this path is within a pre-determined range of admissibility, conclusions may be drawn on a correct axial position of the part to be welded in the stud holding device, particularly on a sufficient length of projection.

According to an embodiment of the invention, the first movement of the stud holding device towards the surface of the workpiece can only be effected until a (first) contact between the stud holding device and the workpiece is detected.

Detecting the contact between the stud holding device and the surface of the workpiece or between the part to be welded and the surface of the workpiece may quite generally be effected e.g. by detecting an electric or mechanical contact.

According to an embodiment of the invention, effecting the movements for the stud holding device in the way described above may exclusively be done by a drive for the stud holding device provided in the welding head of the stud holding device or by an element coupled therewith.

In this embodiment, another drive for positioning the entire welding head will usually be provided, with which the welding head is first positioned relative to the workpiece in such a way that a distance remains between the face of the stud holding device and the surface of the workpiece at the desired welding area. Then, starting from this position, the movements described above can be effected and the measures for detecting the presence of a part to be welded in the stud holding device described above can be taken.

In another embodiment of the invention, moving the stud holding device until a contact between the face of the stud holding device and the surface of the workpiece is achieved can also be effected by means of a positioning drive for the entire stud welding head. Here, corresponding to the method and the device described in EP 0 776 261 B 1, for reasons of simplicity, the movement of the stud holding device by means of the positioning drive for the stud welding head will be effected in such a way that a contact between the stud holding device and the surface of the workpiece is achieved with a sufficient degree of certainty even if relatively large tolerances for the position of the workpiece or the positioning of the welding head or the position of the part to be welded in the stud holding device may occur. For this purpose, the positioning drive may e.g. be provided with one or more values defining an absolute position in space, which position can be reached by means of open or closed loop control.

Thus, with this method, the stud welding head is usually moved towards the workpiece beyond the point of first contact between the stud holding device and the workpiece. In this case, the stud holding device or the drive for the stud holding device (or the welding axle) has to be configured such that the stud holding device can be moved into the welding head in case of an (excess) movement of the welding head towards the workpiece.

Starting from the starting position reached then, the further movements can be made and the further measures for detecting the presence of a part to be welded in the workpiece as explained above can be taken.

In another embodiment of the invention, a part to be welded is already held in the stud holding device when the stud holding device is moved towards the workpiece for the first time. Here, the stud holding device is again moved towards the surface of the workpiece until the face of the part to be welded contacts the surface of the workpiece. For this purpose, the part to be welded is held in the stud holding device—preferably in a locked position—in such a way that the face of the part to be welded projects from the face of the stud holding device by a pre-determined length of projection. This position of the part to be welded corresponds to the usual position in which welding is possible.

After detecting a contact between the part to be welded and the workpiece, the locked position of the part to be welded in the stud holding device is released so that an axial movement of the part to be welded relative to the stud holding device is possible. After releasing the locked position, an attempt is made to move the stud holding device further towards the workpiece. A possible further movement is detected. Instead of holding the part to be welded in a locked position, the part can also be held in such a way that the part to be welded is not pushed into the stud holding device before a pre-determined force of touch-down (of the part on the workpiece) is exceeded.

If a further movement towards the workpiece is detected, one can draw conclusions on the presence of a part in the stud holding device.

If no further movement can be detected, it is assumed that there is no part to be welded in the stud holding device and the welding process is stopped or further measures for supplying a part to be welded to the stud holding device are taken.

If, however, the presence of a part to be welded has been detected, the stud holding device will be lifted off from the surface of the workpiece by a sufficient amount and the part to be welded is moved to the starting position (welding position) again. Then, the welding process can be carried out in the usual way.

According to an embodiment of this method of the invention, the attempt of further movement can be stopped when the power consumption of a drive for the stud holding device and the welding head (depending on which drive is to be used for making the further movement) or the force acting during the attempt of movement in the stud holding device or in an element coupled therewith exceeds a pre-determined value.

If no movement of the stud holding device exceeding a predetermined value is detected between the beginning of the attempt of movement and the moment when this attempt is stopped, the conclusion is drawn that a part to be welded is missing in the stud holding device.

In this embodiment of the method according to the invention, after the part to be welded has been moved into its starting position in the stud holding device again, the stud holding device can be re-positioned regarding its distance to the surface of the workpiece or can be placed onto the surface of the workpiece again. As already explained, this may be done by moving the stud holding device towards the workpiece until a contact is detected and, as the case may be, by subsequently lifting off the stud holding device by a pre-determined distance.

According to another embodiment, a potential contact with the surface of the workpiece is monitored when supplying the part to be welded, too. If a contact is already detected during the process of supplying, one may conclude with a high degree of certainty that a part to be welded was already held in the stud holding device before the process of supplying. In this case, the forward movement of the part to be welded in the stud holding device can be stopped.

On this occasion, it may be remarked that a part to be welded should only be supplied to the stud holding device if there is a sufficient distance between the face of the stud holding device and the surface of the workpiece. This distance must in any case be larger than the length of projection which is to be given after the part to be welded has been supplied.

If it is detected with the above-mentioned measure that a part to be welded was already present in the stud holding device before the process of supplying, the stud holding device can be moved into a position in which—as the case may be, by starting the supply movement of the charging pin again—the part to be welded that was already present before can be ejected from the stud holding device.

The method according to the invention may be integrated in already existing stud welding devices which comprise a microprocessor control unit without any substantial changes in hardware. For this purpose, the method according to the invention may be realized by providing a control program (software) which can be integrated in an already existing evaluation and control unit.

Further embodiments of the invention will be apparent from the subclaims.

BRIEF DESCRIPTION OF THE DRAWINGS

In the following, the invention is explained in greater detail with the aid of embodiments shown in the drawings, in which.

DETAILED DESCRIPTION OF THE PREFERRED EMBODIMENTS

Figure 1:
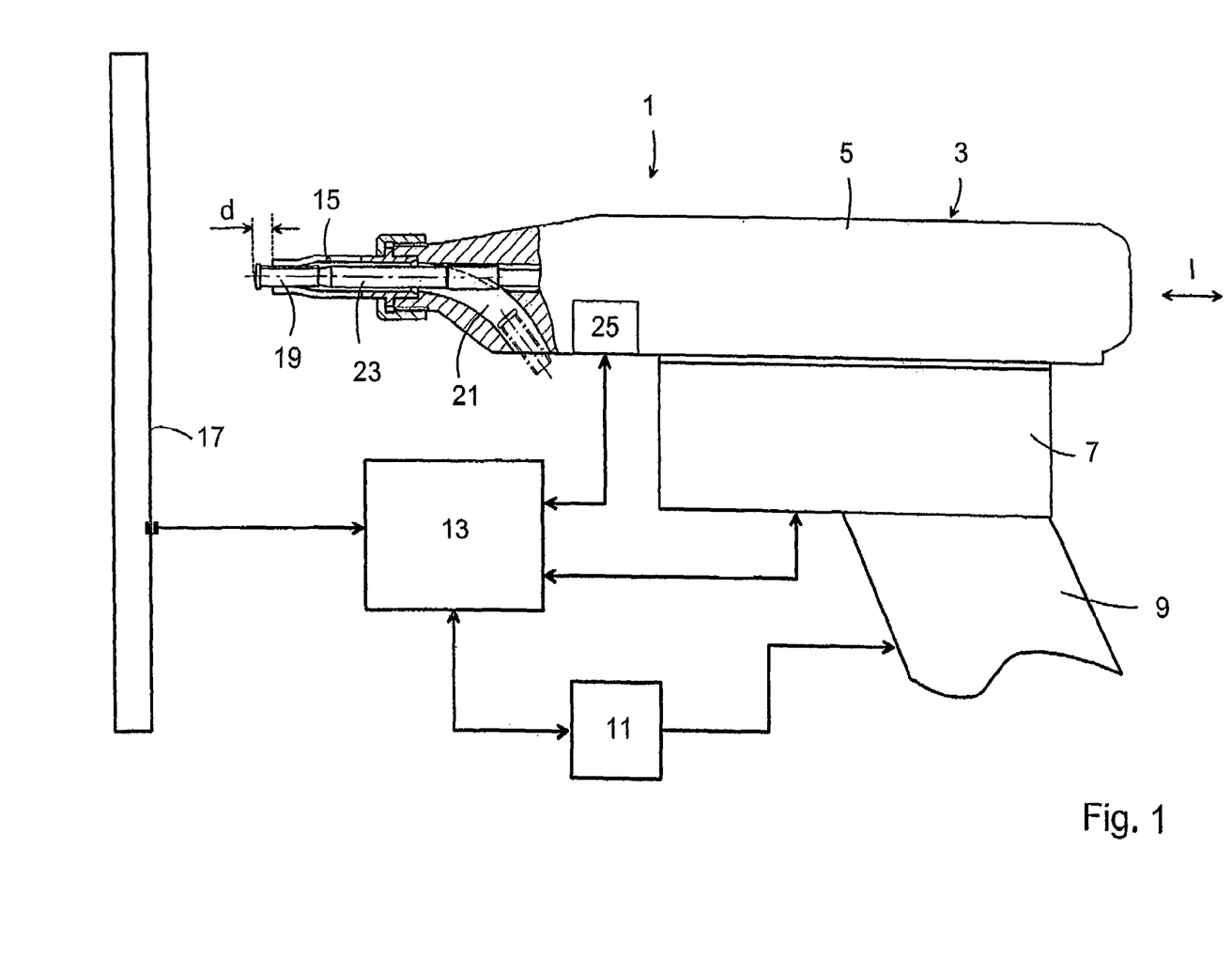
FIG. 1 is a schematic view showing a stud welding device according to the invention.

FIG. 1 shows a stud welding device 1 comprising a stud welding head 3 which in turn consists of the actual welding axle 5 and a drive 7 for axially moving the welding axle 5 (arrow I in FIG. 1).

As indicated in FIG. 1, the entire welding head 3 may be arranged at the arm 9 of a robot by which the welding head 3 is movable in one or several axes.

Both the drive 7 for the welding axle 5 and a drive 11 for the arm 9 of a robot are controlled by an evaluation and control unit 13.

Here, the evaluation and control unit 13 can additionally take over (in a way not illustrated) the further controlling of the welding head 3 regarding the control of the welding current. As the present invention basically relates to a movement of the welding head 3 or of a stud holding device 15 of the welding axle 5, the illustration of further components of the stud welding device 1 was omitted.

FIG. 1 also shows a workpiece 17 onto which a part (stud) 19 to be welded, which is held in the stud holding device 15, is to be welded. The workpiece 17 is in electric contact with the evaluation and control unit 13. This is required firstly for the flow of a welding current during the welding operation and secondly for detecting an electric contact between the stud holding device 15 or the part 19 to be welded and the workpiece 17 in the way explained below.

FIG. 1 furthermore shows that parts 19 to be welded may be supplied to the welding axle 5 of the stud welding head 3 by means of an automatic supply device which is not illustrated in greater detail. This is done by means of a supply conduit 21 in the front portion of the welding head 3, which is connected with the automatic supply device in the usual way by means of a hose (not shown).

Supplying a part 19 to be welded is effected by means of blast air, whereby the part to be welded is moved to the front portion of the stud welding head 3 via the supply conduit 21. In this position, the part to be welded already substantially lies in the axis of the welding axle 5 or the stud holding device 15. The part 19 to be welded is then pushed through the stud holding device to the front portion thereof by a charging pin 23 into an axial position in which welding of the part 19 is possible. For this purpose, the part 19 of course has to project from the face of the stud by a pre-determined projecting length d. The charging pin 23 is acted upon by a drive 25 which is only illustrated schematically in FIG. 1 and which is usually configured as a pneumatic drive. The drive 25 makes it possible to move the charging pin 23 between a front position, in which the face of the charging pin 23 acts upon the rear face of the part 19 to be welded, and a retracted position in which the front portion of the charging pin 23 is retracted to such an extent that the supply conduit 21 is free for supplying a part to be welded. The drive 25 is controlled by the evaluation and control unit 13, as well.

In the following, the stud welding method according to the invention carried out with a device shown in FIG. 1 is explained in greater detail.

For this purpose, FIG. 2 shows different phases or individual steps of a welding operation, with only the front portion of the welding axle 5 being illustrated, respectively, as well as the workpiece 17 onto which one or several parts to be welded are to be welded.

Figure 2A:
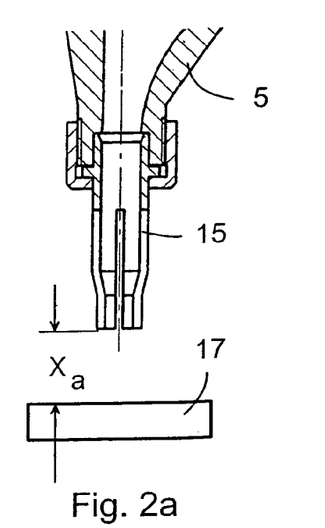
FIG. 2 is a schematic view showing different phases of the movement of the stud holding device for realizing a first embodiment of the method according to the invention.

The phase illustrated in FIG. 2a shows the welding axle 5, already positioned in relation to the workpiece 5. The position shown in FIG. 2a can either be reached by correspondingly controlling the drive 7 for the welding axle 5 or by correspondingly controlling the drive 11 for the arm 9 of a robot.

On this occasion, it may be remarked that controlling the drive 11 for the arm 9 of the robot may not only be effected by the evaluation and control unit 13, as illustrated in FIG. 1, but of course also by an individual evaluation and control unit for the arm of the robot. For this purpose, the two control units may of course communicate with each other in order to guarantee that the welding process proceeds correctly and as efficiently as possible.

Figure 2B:
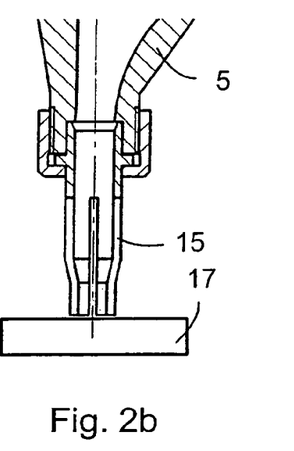

In the position of the welding axle 5 shown in FIG. 2a, the face of the stud holding device 15 is spaced from the surface of the workpiece 17 by a distance $X_c$. Taking this position as a starting point, the welding axle 5 is moved towards the surface of the workpiece until the face of the stud holding device 15 contacts the surface of the workpiece. This phase is illustrated in FIG. 2b. Moving the welding axle may be effected by one of the two drives 7 or 11. Preferably, however, this movement will be effected by the drive 7, as this drive usually makes a more exact positioning of the welding axle 5 in the axial direction thereof possible.

Detecting a contact between the face of the stud holding device 15 and the surface of the workpiece 17 may be effected by applying a measuring voltage between the workpiece 17 and the stud holding device 5. As soon as a flow of current is detected, one may assume that there is an electric contact between the stud holding device and the workpiece, and after the flow of current has been detected, the drive 7 (or, as the case may be, the drive 11) is stopped.

However, a contact between the stud holding device 15 and the workpiece 17 can also be detected e.g. by measuring the driving power of the respective drive, preferably drive 7. As soon as the driving power suddenly increases drastically as a result of a mechanical contact between the workpiece and the stud holding device, it is assumed that there is mechanical contact, and the drive is stopped.

Such an evaluation for detecting an electric or mechanical contact may be carried out in the usual way by the evaluation and control unit. As already mentioned before, for detecting an electric contact, an electrically conductive connection between the workpiece and the evaluation and control unit 13 is made. Furthermore, of course there has to be an electrically conductive connection between the evaluation and control unit 13 and the stud holding device. These electric connections, however, are necessary anyway, as the evaluation and control unit 13 is usually also designed for supplying a welding current.

For detecting a mechanical contact, the evaluation and control unit 13 can detect the power consumption of the drive 7 or the drive 11, too. For this purpose, suitable means may be provided in the evaluation and control unit 13. After placing the stud holding device onto the surface as shown in FIG. 2, the evaluation and control unit 13 controls the drive 7 alternatively, 11) in such a way that the face of the stud holding device 15 is lifted off from the surface of the workpiece by a defined distance $X_c$.

Then, a part 19 to be welded may be fed to the welding axle via the supply conduit 21. For this purpose, the evaluation and control unit 13 may output a signal to a control unit for an automatic supply device (not illustrated). After supplying the part 19 to be welded, this part is moved forward by means of the charging pin 23 in the stud holding device 15 until the welding position is reached. This position or this phase of the welding operation is illustrated in FIG. 2d.

Figure 2C:
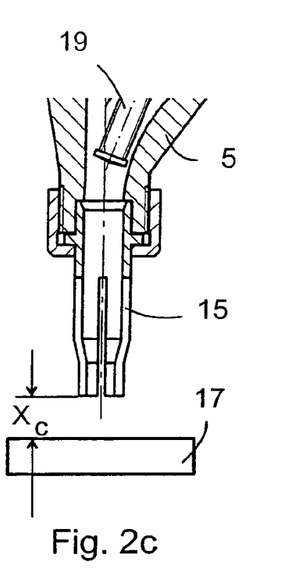
Figure 2D:
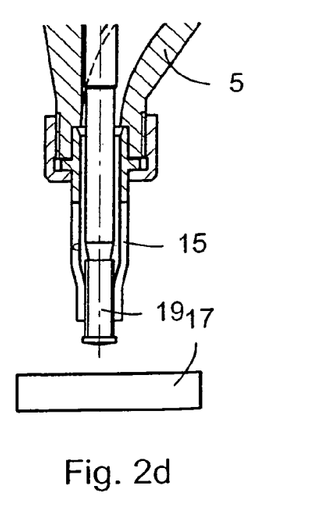

Of course, care must be taken that the distance $X_c$ between the face of the stud holding device 15 and the surface of the workpiece in FIG. 2c is larger or equal to the length d of projection by which the face of the part 19 to be welded projects from the face of the stud holding device 15.

In the next step, the welding axle 5 is again moved towards the surface of the workpiece until a contact between the face of the part 19 to be welded and the surface of the workpiece is detected. As described above, this detection may again be effected by detecting an electric or mechanical contact.

For detecting a mechanical contact in particular, it is important that the charging pin 23 acts upon the rear side of the part 19 to be welded in order to keep this part in the welding position even when its face is placed upon the surface of the workpiece.

If it is not intended that it acts upon it continuously (which is principally possible), after placing the part onto the surface and lifting it off again, as described below, care has to be taken that the part 19 to be welded is pushed forward again into the welding position by moving the charging pin 23 again.

Figure 2E:
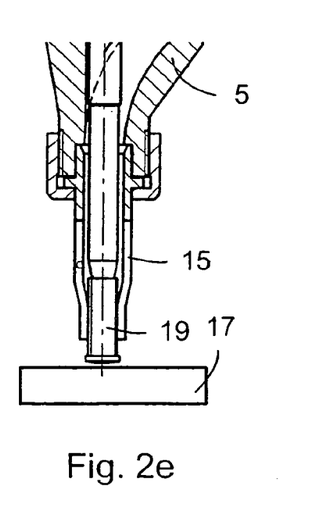

The evaluation and control unit 13 detects the distance $(X_c-d)$ by which the welding axle 5 has to be moved at the transition point from the phase shown in FIG. 2d to the phase shown in FIG. 2e. If the distance detected is smaller than the distance $X_c$ adjusted before, the evaluation and control unit will assume that a part 19 to be welded is present in the stud holding device 15.

However, if the evaluation and control unit 13 ascertains that the distance detected is substantially equal to the distance $X_c$ adjusted before (or that the difference between the distance $X_c$ and the distance detected is smaller than a pre-determined threshold), it will assume that no part to be welded is present in the stud holding device.

However, the difference between the distance $X_c$ and the distance traveled at the transition point between the phases shown in FIGS. 2d and 2e may not only be interpreted or evaluated in the sense of the presence or absence of a part to be welded, but also with respect to a correct axial position of the part 19 to be welded in the stud holding device 15. For example, it may be assumed that the position is correct if the difference between the distance $X_c$ and the distance traveled is within a pre-determined range.

However, if it is presupposed that the stud was pushed into the correct position within the stud holding device 15 by means of the charging pin 23, when using studs with different lengths one may draw conclusions on whether a stud having the desired length is present in the stud holding device, because without any adjustment of the front end position of the charging pin 23, a longer stud will project more from the front end of the stud holding device (i.e. a smaller distance $X_c-d$ is detected) than a shorter stud.

If the absence of a part 19 to be welded or an incorrect axial position thereof in the stud holding device is detected, either an error signal or an operator recall signal may be generated, or measures for failure corrective action may be taken. For example, if the absence of a part 19 to be welded is detected, another supply operation may be triggered.

Figure 2F:
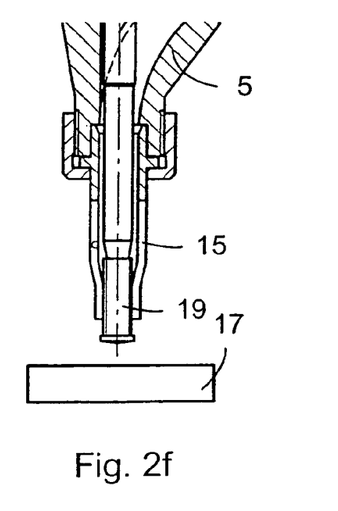

If the presence and, as the case may be, the correct position of a part 19 to be welded in the stud holding device 15 are detected, the actual welding operation may be triggered in the phase shown in FIG. 2e. For example, in the case of welding with stroke ignition, the pre-current may be switched on and then, as illustrated in FIG. 2f, the welding axle 5 may be lifted off from the surface of the workpiece by a pre-determined distance so that the pre-current arc is created. Then, the main current electric arc may be started and the welding axle may be moved towards the workpiece and may be immersed in the molten mass after a pre-determined welding time.

In practice, a case may occur in which, for certain reasons, another part to be welded is already held in the stud holding device 15 before a part 19 to be welded is fed to the stud holding device.

In the process shown in FIG. 2, in the phase according to FIG. 2d, this would have the consequence that, when supplying another part to be welded, the part that is already present in the stud holding device 15 would be moved further to the front, i.e. towards the surface of the workpiece. If the length of the part 19 to be welded exceeds the distance $X_c$ adjusted before, this will lead to a contact between the face of the part to be welded that was already present before and the surface of the workpiece. This contact may in turn be detected. If the evaluation and control unit 13 already detects an electric or mechanical contact during the charging operation, i.e. during the movement of the charging pin 23 by means of the drive 25, this will be interpreted as the error explained above. In this case, the welding axle 5 may be lifted off from the surface of the workpiece by a distance which makes it possible to eject the part to be welded that is already held in the stud holding device 15 by further or again controlling the charging pin 23. For this purpose, it is of course also possible to control the drive 11 in such a way that the stud welding head is moved to a place where ejecting the part to be welded that is already present is possible without danger.

Instead of positioning the welding axle at a distance $X_c$ from the surface of the workpiece as shown in FIG. 2a, this process can be modified such that the welding axle or the entire welding head is at first moved towards the surface of the workpiece by means of the drive 11 until the stud holding device and the surface of the workpiece contact each other. At this point, however, the drive 11 is not stopped, but is moved further towards the workpiece until a pre-determined absolute position of the welding head 5 is reached. In order to make such a movement possible after the stud holding device and the workpiece have contacted each other, the drive 7 may be configured such and may be controlled to enter such a condition that it is possible to axially displace the welding axle 5 as a result of the further movement of the drive 11. In other words, after the first contact between the stud holding device and the workpiece, the drive 11 is moved further in such a way that the entire welding head moves further in the axial direction. This movement is compensated by an axial countermovement of the welding axle 5 relative to the drive 7. In this way, too, it is possible to reach the position according to FIG. 2b. For this purpose, however, it is not necessary to detect a contact between the stud holding device and the workpiece. Rather, the drive 11 for the stud welding head 3 may be moved in such a way that in spite of tolerances occurring when positioning the workpiece 17 and when moving the arm 9 of the robot or the entire welding head 3, an (absolute spatial) position is taken securely, in which the face of the stud holding device 15 and the surface of the workpiece 17 contact each other.

FIG. 3 shows different phases a to f of another method according to the invention. In this method, in the first step, the welding axle or the entire stud welding head is again positioned such that there is a distance $X_c$ between a part 19 to be welded which is already held in the stud holding device 15 and the surface of the workpiece. In the next step, preferably using the drive 7, the welding axle 5 is moved towards the workpiece 17 until a contact is detected. The contact may be detected as explained above. After the contact has been detected as shown in FIG. 3b, the charging pin 23, which for the present has held the part 19 to be welded in its position, is moved back. Then, another attempt is made to move the welding axle 5 further towards the workpiece 17. As the part 19 to be welded is not acted upon by the charging pin 23 any more, this is possible if a part to be welded is really held in the stud holding device 15. Otherwise, the face of the stud holding device would rest upon the surface of the workpiece and would block such a further movement.

If the evaluation and control unit, which controls the entire sequence of movements, detects that such a further movement towards the surface of the workpiece is possible, it is assumed that a part to be welded is really held in the stud holding device 15. For this purpose, the evaluation and control unit can of course detect whether a movement of the welding axle 5 by a distance which is larger than a pre-determined threshold value is possible.

When the attempt of a further movement towards the workpiece is started, the evaluation and control unit simultaneously detects the potential existence of a "rigid mechanical contact" which exists if the stud holding device itself rests upon the workpiece. Again, this may be effected by detecting the power consumption of the drive 7 or 11, depending on which of the two drives is employed for the movement. Preferably, however, the drive 7 for the welding axle will be chosen.

If a mechanical contact is detected without a movement of the welding axle or the welding head towards the workpiece having been possible, the control unit 13 will assume that no part to be welded is held in the stud holding device 15. In this case, the operation may be stopped and an error signal or an operator recall signal may be generated, or the welding head may be lifted off from the workpiece by a sufficient amount and an operation for the supply of a part 19 to be welded may be triggered.

On this occasion, it is to be pointed out explicitly again that a mechanical contact may also be detected by detecting that unusually high forces arise in the stud holding device or in the welding axle. For this purpose, the evaluation and control unit can evaluate the signal of a force or strain sensor.

Figure 3A:
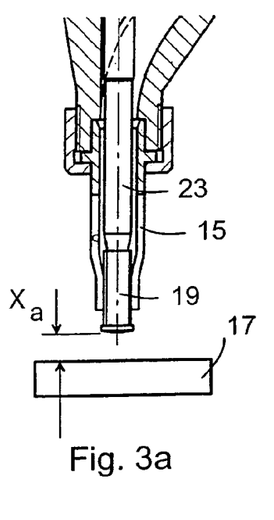
FIG. 3 is a schematic view showing different phases of the movement of the stud holding device for realizing a second embodiment of the method according to the invention.
Figure 3B:
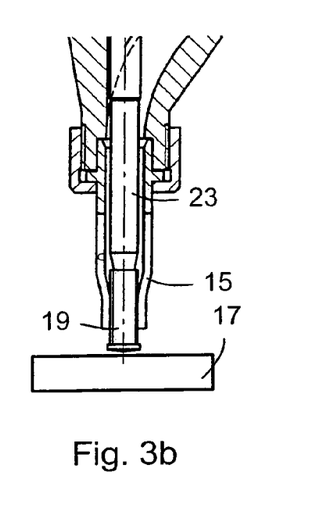
Figure 3C:
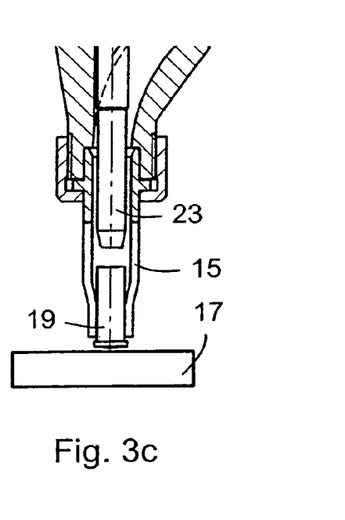
Figure 3D:
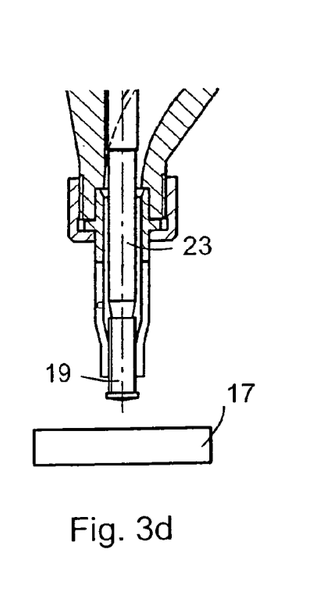
Figure 3E:
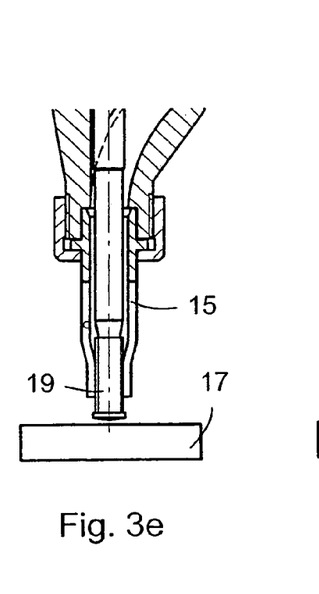
Figure 3F:
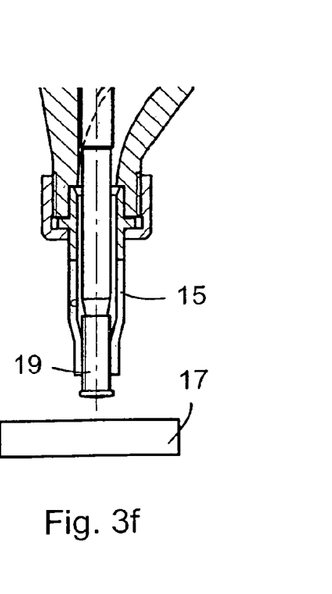

When the evaluation and control unit 13 has detected the presence of a part 19 to be welded in the stud holding device 15, the welding axle or the welding head can be lifted off from the workpiece and the drive 25 can be controlled in such a way that the part to be welded is pushed to the front into its welding position again. This phase is shown in FIG. 3d.

Then, the welding head can be moved towards the workpiece 17 again until the evaluation and control unit 13 detects a contact. Afterwards, one of the usual welding processes may be started. For example, for the stroke ignition method, the pre-current may be switched on in the phase shown in FIG. 3e, so after lifting off the welding axle by the distance h according to FIG. 3f, the pre-current electric arc is struck.

With the method shown in FIG. 3, it is also possible to decide whether a stud having the right length is held in the stud holding device if studs having different lengths are used: For this purpose, from the point of time when the stud contacts the workpiece and the charging pin 23 is retracted or is enabled to freely move in the axial direction again, the welding axle 5 is moved further towards the workpiece until a contact between the stud holding device 15 and the workpiece is detected (e.g. by detecting the power consumption of the drive). The distance covered between the point at which the stud contacts the workpiece and the point at which the stud holding device contacts the workpiece corresponds to the projecting length d of the stud in the stud holding device. This projecting length is larger if a longer stud is present than if shorter studs are present—without changing the front end position of the charging pin.

In this way, in the embodiments described above, the invention makes it possible to securely decide whether a part to be welded is held in the stud holding device. Particularly in case of welding without a supporting foot, this will help to securely avoid that the stud holding device itself is welded onto the workpiece if a part to be welded is missing. In the usual welding methods, too, in which a supporting foot is used, it is possible to avoid that an electric arc is struck between the face of the stud holding device and the surface of the workpiece and that the stud holding device is damaged thereby. Furthermore, it is possible to draw the conclusion that the stud is positioned correctly in the stud holding device or that a stud having the right length as desired is present.

The invention claimed is:

1. A stud welding method for welding a stud held retained in a stud holding device of a stud welding head to a workpiece, comprising the steps of:
    a) providing a workpiece;
    b) providing a footless welding head;
    c) positioning the footless welding head in relation to the workpiece, thereby establishing a predetermined distance including moving the stud holding device towards the surface of the workpiece at least until a face of the stud holding device contacts the surface of the workpiece and then separating the stud holding device from the workpiece a predetermined distance between the face of the stud holding device and the surface of the workpiece;
    d) supplying a stud to the footless welding head;
    e) verifying the presence of the stud in the footless welding head; and
    f) performing a welding operation if the stud presence is verified.

2. The method according to claim 1 wherein the step e) includes:
    i) moving the stud holding device towards the surface of the workpiece until contact between the stud and the workpiece is detected, and determining the distance the stud holding device was moved from the position that was reached after step c) until contact with the workpiece is detected; and
    ii) comparing the distance determined in step c) with the distance determined in step i), wherein the presence of the stud is assumed if the difference between the distance determined in step c) and step i) exceeds a predetermined distance by a predetermined amount.

3. The method according to claim 1, wherein step c) is further defined by moving the stud holding device toward the workpiece until contact between the stud holding device and workpiece is detected by electrical or mechanical contact.

4. The method according to claim 1 including the step of providing a drive mechanism associated with the stud welding head for moving the stud welding head toward and away from the workpiece.

5. The method according to claim 1, further including the step of retracting the stud holding device from the workpiece when a resistance to movement of the stud holding device toward the workpiece reaches a predetermined value.

6. A method according to claim 1, further including the step of repositioning the stud holding device and the welding stud retained therein by detecting contact between the workpiece and the welding stud and retracting the stud from the workpiece a predetermined distance.

7. The method according to claim 1, further including the step of terminating supplying the welding stud to the stud welding device when contact between the welding stud retained by the stud welding device and the workpiece is detected.

* * * * *

UNITED STATES PATENT AND TRADEMARK OFFICE
CERTIFICATE OF CORRECTION

PATENT NO.         : 7,339,133 B2                                    Page 1 of 1
APPLICATION NO. : 11/399148
DATED              : March 4, 2008
INVENTOR(S)        : Ulrich Citrich et al.

It is certified that error appears in the above-identified patent and that said Letters Patent is hereby corrected as shown below:

Col. 2, line 50: delete the following sentence: "The invention achieves this object with the features of patent claims 1 and 10 and 15."
       Col. 7, line 55: replace "alternatively, 11)" with --alternatively, 11,--
       Col. 10, line 61: replace "are used:" with --are used.--

Signed and Sealed this

Seventh Day of July, 2009

JOHN DOLL
*Acting Director of the United States Patent and Trademark Office*